United States Patent
Kajizaki et al.

(10) Patent No.: US 7,274,711 B2
(45) Date of Patent: Sep. 25, 2007

(54) NETWORK RELAY APPARATUS AND METHOD OF COMBINING PACKETS

(75) Inventors: Noriki Kajizaki, Fukuoka (JP);
Shigeru Suzuyama, Fukuoka (JP);
Akira Tokunaga, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 827 days.

(21) Appl. No.: 09/808,060

(22) Filed: Mar. 14, 2001

(65) Prior Publication Data

US 2001/0055317 A1   Dec. 27, 2001

(30) Foreign Application Priority Data

Jun. 21, 2000 (JP) ............................. 2000-186783

(51) Int. Cl.
*H04J 3/24* (2006.01)
*H04L 12/28* (2006.01)

(52) U.S. Cl. ...................... 370/473; 370/401

(58) Field of Classification Search ........ 370/471–474, 370/469, 401, 402, 389, 392, 230–235
See application file for complete search history.

(56) References Cited

U.S. PATENT DOCUMENTS

| | | | |
|---|---|---|---|
| 5,408,618 A * | 4/1995 | Aho et al. .................. | 710/104 |
| 5,892,753 A * | 4/1999 | Badt et al. .................. | 370/233 |
| 5,940,372 A * | 8/1999 | Bertin et al. ................ | 370/238 |
| 5,959,974 A * | 9/1999 | Badt et al. .................. | 370/233 |
| 6,003,089 A * | 12/1999 | Shaffer et al. ............. | 370/232 |
| 6,212,190 B1 * | 4/2001 | Mulligan .................... | 370/473 |
| 6,229,821 B1 * | 5/2001 | Bharucha et al. .......... | 370/471 |
| 6,389,038 B1 * | 5/2002 | Goldberg et al. .......... | 370/473 |
| 6,400,681 B1 * | 6/2002 | Bertin et al. ................ | 370/238 |
| 6,438,137 B1 * | 8/2002 | Turner et al. ............... | 370/471 |
| 6,556,574 B1 * | 4/2003 | Pearce et al. ............... | 370/401 |
| 6,614,808 B1 * | 9/2003 | Gopalakrishna ........... | 370/469 |
| 6,721,334 B1 * | 4/2004 | Ketcham .................... | 370/473 |

FOREIGN PATENT DOCUMENTS

| | | |
|---|---|---|
| JP | 1-241243 | 9/1989 |
| JP | 2-166856 | 6/1990 |
| JP | 6-37793 | 2/1994 |
| JP | 7-177176 | 7/1995 |

* cited by examiner

*Primary Examiner*—Steven Nguyen
(74) *Attorney, Agent, or Firm*—Katten Muchin Rosenman LLP

(57) ABSTRACT

Network load is reduced by combining packets by considering the MTU of a transmission path. When a routing processing unit detects the transmission of a large number of packets addressed to the same destination network, a routing information gathering unit determines the MTU of a transmission path along which the packets are to be transmitted. A combining unit assembles a combined packet by combining packets up to a length that does not exceed the MTU of the transmission path, and sends out the combined packet.

8 Claims, 27 Drawing Sheets

Fig.3

ROUTING TABLE IN ROUTER 81

| NETWORK | NEXT HOP ROUTER | DISTANCE | TRANSMISSION PATH MTU | COMBINED PACKET | DISASSEM-BLING ROUTER |
|---|---|---|---|---|---|
| D | 82 | 2 | 1500 | ACCEPTABLE | 83 |
| D | 83 | 1 | 576 | ACCEPTABLE | 83 |
| --- | --- | --- | --- | UN-ACCEPTABLE | --- |

Fig.4

ROUTING TABLE IN ROUTER 82

| NETWORK | NEXT HOP ROUTER | DISTANCE | TRANSMISSION PATH MTU | COMBINED PACKET | DISASSEM-BLING ROUTER |
|---------|-----------------|----------|----------------------|-----------------|----------------------|
| A | 81 | 1 | 2048 | ACCEPTABLE | 81 |
| D | 83 | 1 | 1500 | ACCEPTABLE | 83 |
| --- | --- | --- | --- | UN-ACCEPTABLE | --- |

Fig.5

ROUTING TABLE IN ROUTER 83

| NETWORK | NEXT HOP ROUTER | DISTANCE | TRANSMISSION PATH MTU | COMBINED PACKET | DISASSEMBLING ROUTER |
|---|---|---|---|---|---|
| A | 82 | 2 | 1500 | ACCEPTABLE | 81 |
| A | 81 | 1 | 576 | ACCEPTABLE | 81 |
| --- | --- | --- | --- | UNACCEPTABLE | --- |

Fig.6

NETWORK ADDRESSES OF NETWORKS

| NETWORK | NETWORK ADDRESS | SUBNET MASK |
|---------|-----------------|-------------|
| A | 10.100.0.0 | 255.255.0.0 |
| B | 10.0.0.0 | 255.0.0.0 |
| C | 20.0.0.0 | 255.0.0.0 |
| D | 20.210.0.0 | 255.255.0.0 |
| E | 20.200.0.0 | 255.255.0.0 |
| F | 10.100.1.0 | 255 255 255.0 |
| G | 30.0.0.0 | 255.0.0.0 |

Fig.17

ROUTING TABLE IN ROUTER 81

| NETWORK | NEXT HOP ROUTER | DISTANCE | TRANSMISSION PATH MTU | COMBINED PACKET | DISASSEMBLING ROUTER | PATH ATTRIBUTE | NETWORK CONDITION |
|---|---|---|---|---|---|---|---|
| D | 82 | 2 | 1500 | ACCEPTABLE | 83 | NON-REAL TIME ROUTE | CONGESTED |
| D | 83 | 1 | 576 | ACCEPTABLE | 83 | REAL TIME ROUTE | NORMAL |
| --- | --- | --- | --- | --- | --- | --- | --- |

Fig.21

ROUTING TABLE IN ROUTER 84

| NETWORK | NEXT HOP ROUTER | DISTANCE | TRANSMISSION PATH MTU | COMBINED PACKET | DISASSEM-BLING ROUTER | NETWORK CONDITION |
|---|---|---|---|---|---|---|
| D | 81 | 3 | 1500 | ACCEPTABLE | 83 | NORMAL |
| --- | --- | --- | --- | --- | --- | --- |

Fig.22

ROUTING TABLE IN ROUTER 81

| NETWORK | NEXT HOP ROUTER | DISTANCE | TRANSMISSION PATH MTU | COMBINED PACKET | DISASSEM-BLING ROUTER | NETWORK CONDITION |
|---|---|---|---|---|---|---|
| D | 82 | 2 | 1500 | ACCEPTABLE | 83 | FAILED |
| D | 87 | 2 | 576 | ACCEPTABLE | 83 | NORMAL |
| --- | --- | --- | --- | --- | --- | --- |

# NETWORK RELAY APPARATUS AND METHOD OF COMBINING PACKETS

BACKGROUND OF THE INVENTION

1. Field of the Invention

The present invention relates to a network relay apparatus and a method of combining packets in a network in which, as in the Internet Protocol (IP), packet size is variable in length and maximum transmission unit (MTU) size for the network is predetermined primarily according to the physical medium and communication standard, and in which communications are performed by the network relay apparatus (router) controlling transmission paths.

2. Description of the Related Art

A network relay apparatus in a network in which packet length is variable as in the Internet Protocol (IP) performs transmission path control (routing control) according to the packet destination by using routing information gathered and stored in advance. In the network relay apparatus, even when a plurality of packets addressed to the same destination network have arrived in a bursty manner, the routing control is performed on a packet-by-packet basis.

In such prior art, even when a plurality of packets addressed to the same destination network have arrived at the network relay apparatus in a bursty manner, the routing control has had to be performed on a packet-by-packet basis, and this has been a factor working to increase the processing load of the network relay apparatus.

To solve this problem, Japanese Unexamined Patent Publication No. 1-241243 proposes a method that reduces the routing control processing load of the network relay apparatus by combining a plurality of packets and thereby reducing the number of packets.

In a network, a value called the maximum transmission unit (MTU) is set for each physical medium. This value specifies the maximum packet size (the number of octets) that can be transmitted over the physical medium. If the MTU of the physical medium on the route along which a packet is transmitted is smaller than the size of the packet, the network relay apparatus either discards the packet or fragments it to the MPU size for transmission.

More specifically, in the method of Japanese Unexamined Patent Publication No. 1-241243, when combining packets, no account is taken of the MTU of the medium or the network to which the combined packet is transmitted; accordingly, even when the number of packets is reduced by combining a plurality of packets for transmission, if the MPU of the transmission path is smaller than the combined packet size, the packet transmitted is discarded or fragmented, resulting in an inability to make full use of the effect achieved by combining packets.

SUMMARY OF THE INVENTION

It is an object of the present invention to reduce network load by combining, disassembling, or reassembling packets by considering the MTU of the transmission path to the packet destination in the network. The invention also proposes to flexibly apply this technique in accordance with the condition of the network and the attribute of information carried in each packet.

The above object is achieved by a network relay apparatus comprising: a routing information gathering unit for determining the maximum transmission unit of a transmission path along a route over which packets are to be transmitted; and a combining unit for assembling a combined packet by combining packets up to a length that does not exceed the maximum transmission unit of the transmission path.

Preferably, the combined packet carries as a destination address the address of an endpoint of the route over which the packets are transmitted in combined form, the apparatus further comprises a disassembling unit for disassembling a received combined packet into individual packets if the destination address of the received combined packet matches the address of the apparatus.

Preferably, the apparatus further comprises a routing processing unit for selecting a path having the largest maximum transmission unit as a path for the combined packet from among a plurality of transmission paths to the same destination.

Preferably, the routing processing unit selects a path having the largest maximum transmission unit as a path for the combined packet from among a plurality of transmission paths to the same destination by excluding the path along the shortest route.

BRIEF DESCRIPTION OF THE DRAWINGS

FIG. 3 is a diagram showing a routing table in a router 81 shown in FIG. 2;

FIG. 4 is a diagram showing a routing table in a router 82 shown in FIG. 2;

FIG. 5 is a diagram showing a routing table in a router 83 shown in FIG. 2;

FIG. 6 is a diagram showing the network addresses of respective networks;

FIG. 17 is a diagram showing one example of a routing table structure in the second embodiment of the present invention;

FIG. 21 is a diagram showing a routing table in a router 84 shown in FIG. 20;

FIG. 22 is a diagram showing a routing table in a router 81 shown in FIG. 20;

DESCRIPTION OF THE PREFERRED EMBODIMENTS

Figure 1:
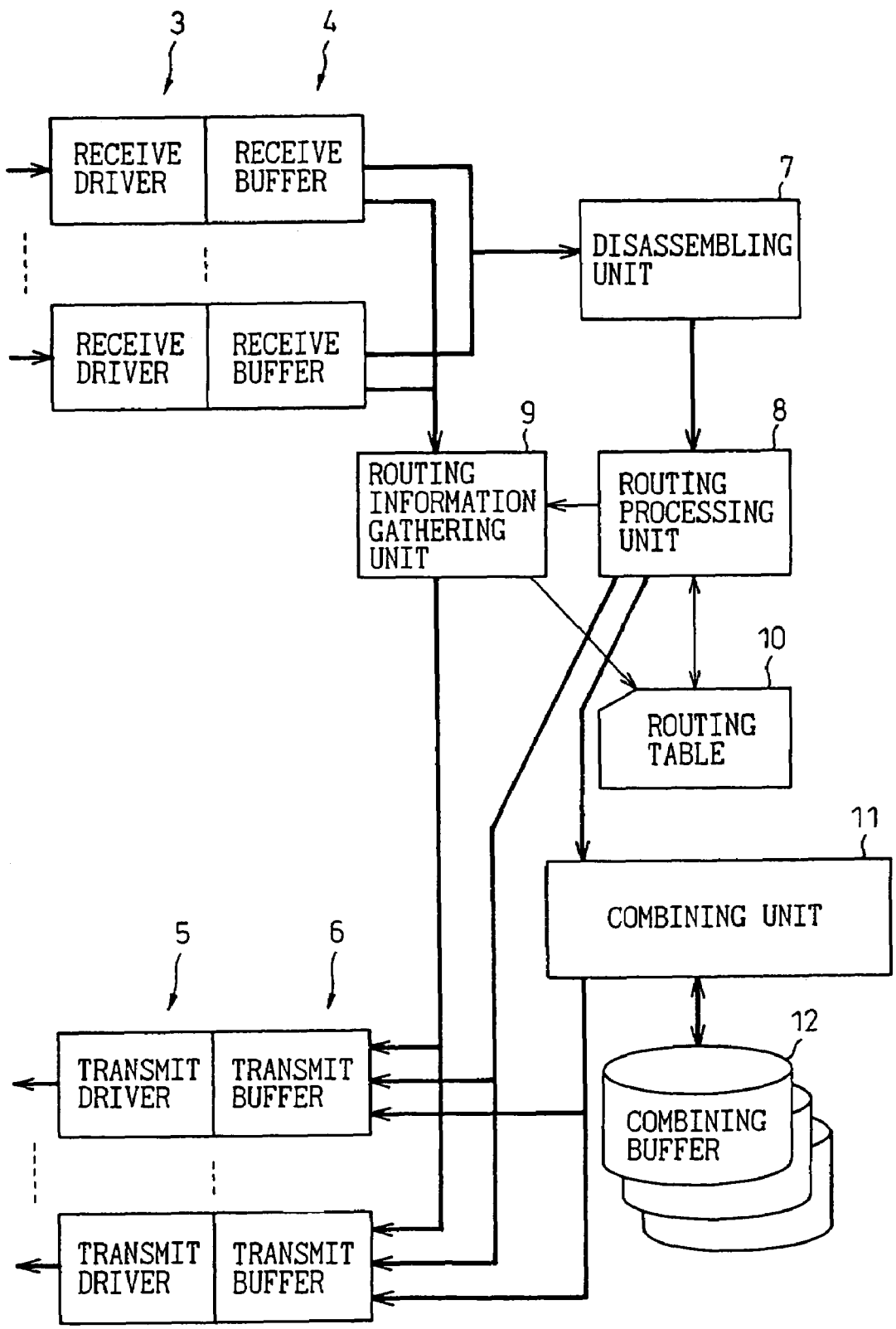
FIG. 1 is a block diagram of a network relay apparatus according to a first embodiment of the present invention.

FIG. 1 is a block diagram showing the configuration of a network relay apparatus (router) according to one embodiment of the present invention.

In FIG. 1, a receive driver 3 stores a packet, received from a transmission line, in a receive buffer 4 and notifies a routing information gathering unit 9 of the reception of the packet if it is a packet for a routing protocol (a routing information gathering procedure); if it is not, the receive driver 3 notifies a disassembling unit 7 of the reception of the packet.

When the destination address of the received packet matches the address of the current apparatus, the disassembling unit 7 identifies whether the received packet is a combined packet and, if it is a combined packet, disassembles it into individual packets and passes them to a routing processing unit 8. Otherwise, the combined packet is passed as is to the routing processing unit 8.

The routing processing unit 8 selects the best outgoing path by referring to a routing table 10 based on the destination address of the packet, and sends the packet to a corresponding transmit buffer 6 or to a combining unit 11. A transmit driver 5 transmits the packets accumulated in the transmit buffer onto a transmission line.

The routing information gathering unit 9, using the routing protocol, gathers routing information from network relay apparatuses residing on the networks connected to it. In the present invention, a function of gathering transmission path MTU for each route, in addition to the routing information, is added.

The routing table 10 is a table created by the routing information gathering unit 9, and stores transmission routes for each destination network. In the present invention, areas for storing transmission path MTU and network condition for each transmission route are added.

The combining unit 11 stores the packets to be combined in a combining buffer 12, assembles a combined packet, and sends a combine packet transmit request to the transmit driver 5.

Figure 2:
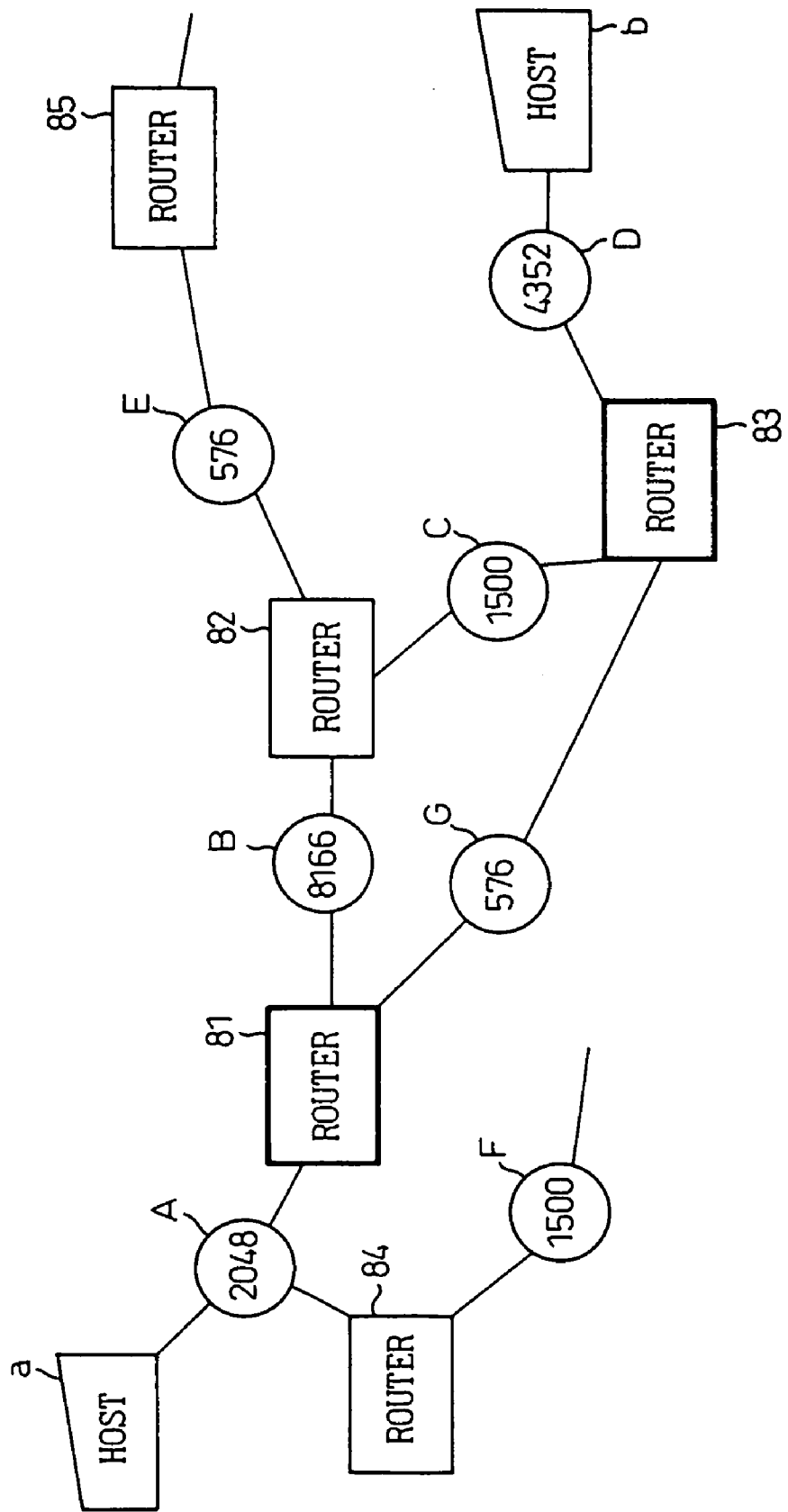
FIG. 2 is a diagram showing an IP network as an example of the network configuration to which the present invention is applied.

FIG. 2 is a diagram showing one example (IP network) of the network configuration using the above-described network relay apparatus (router). In the figure, circles designate networks A to G, and the numbers within the circles indicate the MTUs of the respective networks. A router 84 interconnects the networks A and F, a router 81 interconnects the networks A, B, and G, a router 82 interconnects the networks B, C, and E, and a router 83 interconnects the networks C, D, and G. A host a belongs to the network A, while a host b belongs to the network D. FIGS. 3, 4, and 5 show the routing tables maintained in the routers 81, 82, and 83, respectively, and the columns bounded by thick solid lines are the fields added according to the present invention. FIG. 6 shows the network addresses assigned to the respective networks.

As can be seen from FIGS. 2 to 5, packets originating from the host a and destined to the host b are combined in the router 81, and the combined packet is transmitted along a first route passing through the network B, the router 82, and the network C, or a second route passing through the network G, and is disassembled in the router 83. The transmission path MTU of the first route is 1500 which is equal to the MTU of the network C that has the smallest MTU in the route, and the transmission path MTU of the second route is 576 which is equal to the MTU of the network G. Packets sent from the host b to the host a are transmitted along the same route, but in the opposite direction.

The process of setting the information in the thick-lined columns in the routing tables of FIGS. 3 to 5 will be described below.

The example described below assumes the case where, in the IP network shown in FIG. 2, the router 81 receives a large number of packets, each about 500 bytes in size and destined for the network D, from the host a and the router 84, and that the packets received from the host a and the router 84 are not packets combined by the method of the present invention.

The routing information gathering unit 9 gathers information about combined packet acceptable/unacceptable status, IP address of disassembling router, and transmission path MTU, and records these pieces of information in the corresponding columns for each route. The method of acquiring the IP address of the disassembling router, the method of detecting the combined packet acceptable/unacceptable status, and the method of discovering the transmission path MTU will be described with reference to FIGS. 7 to 9.

When the transmission of a large number of individual packets addressed to the same destination is detected, preparations are made for the combining/disassembling operations according to the present invention. Before starting the combining/disassembling operations according to the present invention, first it is necessary to acquire the IP address of the destination router (hereinafter called the disassembling router) of the combined packet, i.e., the router at the endpoint of the route along which the combined packet is to be transmitted.

Figure 7:
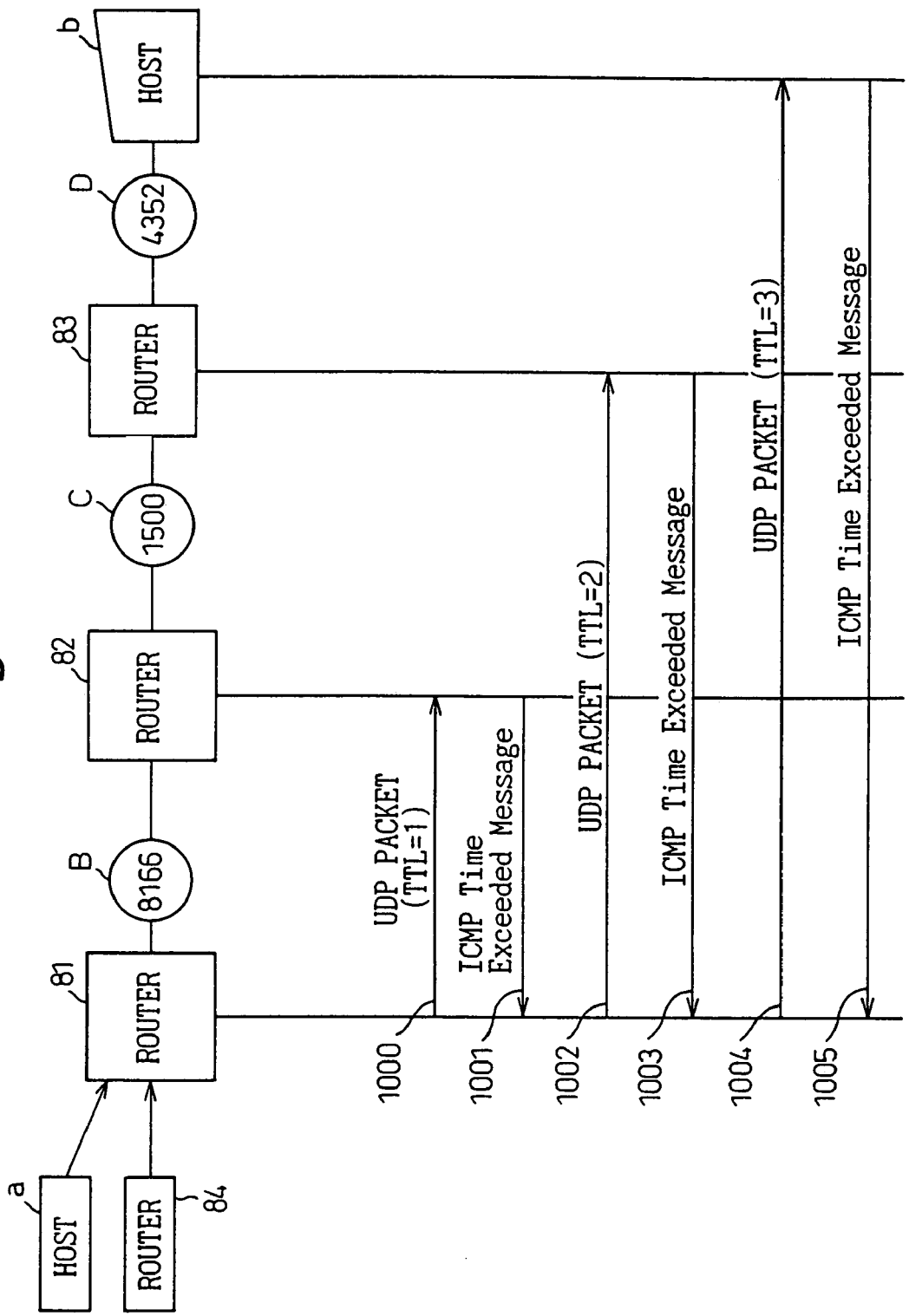
FIG. 7 is a diagram illustrating a procedure for detecting a disassembling router.

For this purpose, traceroute shown in FIG. 7 is executed to the destination of the individual packets. In traceroute, UDP packets with the value of the time-to-live (hereinafter called the TTL) field in the IP header successively incremented by 1 are transmitted repeatedly until the final destination is reached (steps 1000, 1002, and 1004). When relaying a packet, a router decrements the TTL by 1. When the TTL is decremented to 0, the router, being unable to transmit the packet any further, returns an ICMP Time Exceeded message to the sender of the packet (steps 1001, 1003, and 1005). The transmission route is discovered by recording the sender's IP address contained in the ICMP Time Exceeded message returned from each router. The details of traceroute are defined in RFC 1393. When the route from the router 81 to the host b is discovered by the router 81 in this way, the IP address of the router 83 one hop before the host b is recorded as the IP address of the disassembling router in the "DISASSEMBLING ROUTER" column in the routing table maintained in the router 81.

Figure 8:
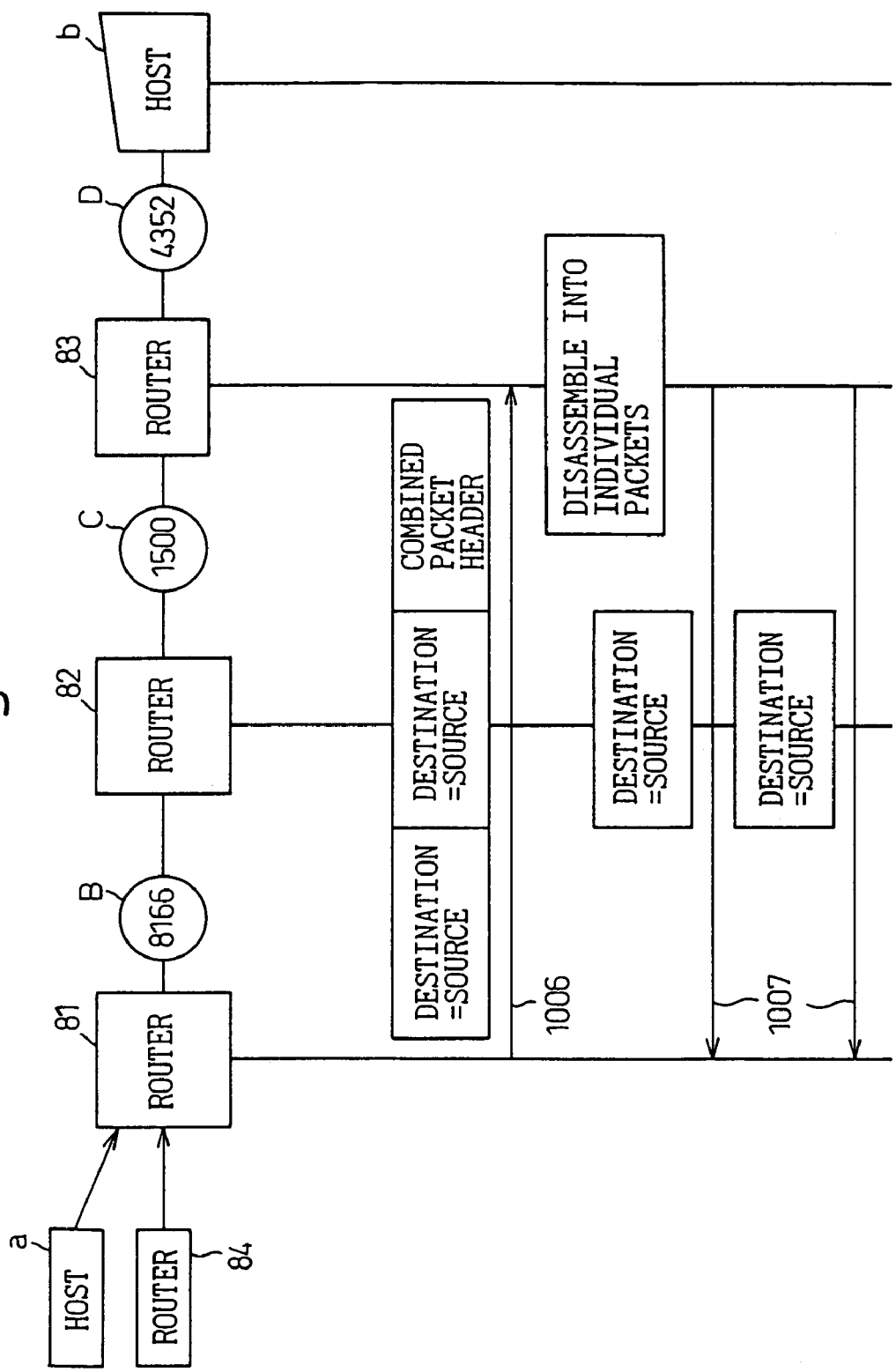
FIG. 8 is a diagram illustrating a procedure for examining whether the disassembling router supports a combined packet disassembling function.

It is then necessary to examine whether the thus discovered disassembling router has the function of disassembling a combined packet by recognizing it as a combined packet when the combined packet according to the present invention arrives. The method of examination is illustrated in FIG. 8. The router (in this example, the router 81) that examines the combined packet acceptable/unacceptable status transmits a combined packet, constructed by combining a plurality of packets addressed to itself, to the disassembling router (step 1006). If the destination router is capable of disassembling the packet, the source router should receive disassembled individual packets from the disassembling router (step 1007). The presence or absence of the disassembling capability is examined based on whether the disassembled individual packets are received or not, and if the destination router proves to have the disassembling capability, the combined packet acceptable/unacceptable status for that route is set to ACCEPTABLE, which is recorded in the "COMBINED PACKET" column in the routing table.

Figure 9:
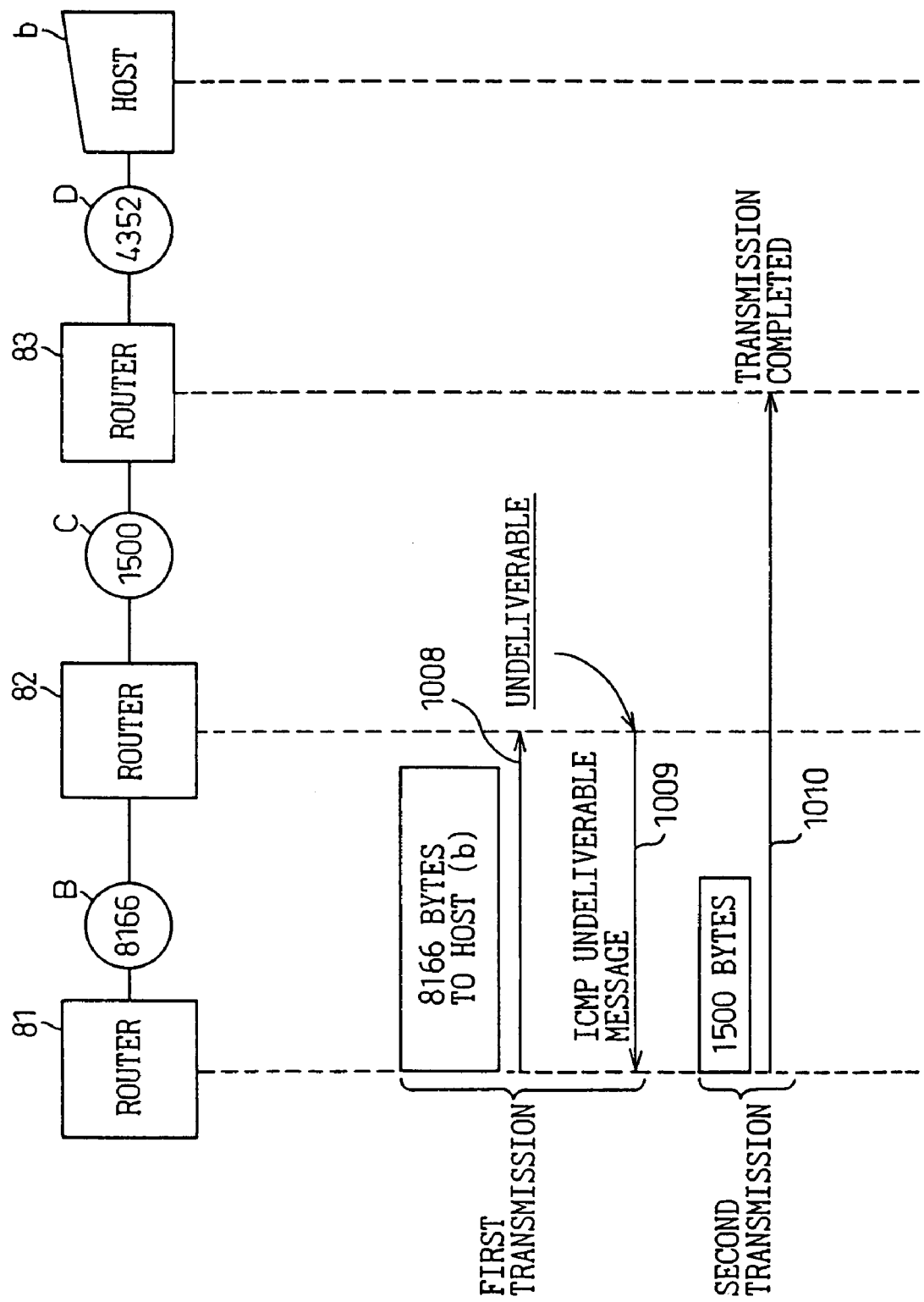
FIG. 9 is a diagram illustrating a procedure for detecting transmission path MTU.

The method of discovering the transmission path MTU of the transmission route thus detected to the disassembling router will be described with reference to FIG. 9. The router 81 transmits to the disassembling router a fragmentation-inhibited IP packet (fragmentation-inhibit flag in the Flag field in the IP header is set to 1) of 8166 bytes size equal to the MTU size of the network B to which the router 81 is connected (step 1008). The router 82 cannot forward the IP packet to the router 83 because the MTU of the intermediate network C is 1500. To report this undeliverable condition, the router 82 returns an ICMP Undeliverable message to the originating router 81 of the-IP packet (step 1009). This message contains the MTU of the network C. Therefore, the router 81 transmits to the router 83 an IP packet of 1500 bytes size which is equal to the MTU size of the network C (step 1010). Since the router 83 successfully receives the IP packet, it does not return an ICMP Undeliverable message. In this way, the router 81 discovers that the MTU of the transmission route to the router 83 is 1500. The method of discovering transmission path MTU is defined in RFC 1191. The transmission path MTU thus determined is recorded in the "TRANSMISSION PATH MTU" column in the routing table.

The flow of the packet combining process in the router 81 will be described below. The disassembling unit 7 sequentially receives each packet via the receive driver 3. Since the received packet is addressed to the network D, not to the current apparatus, the disassembling unit need not disassemble the packet. Accordingly, each packet is reported to the routing processing unit 8 as it is received.

Figure 10:
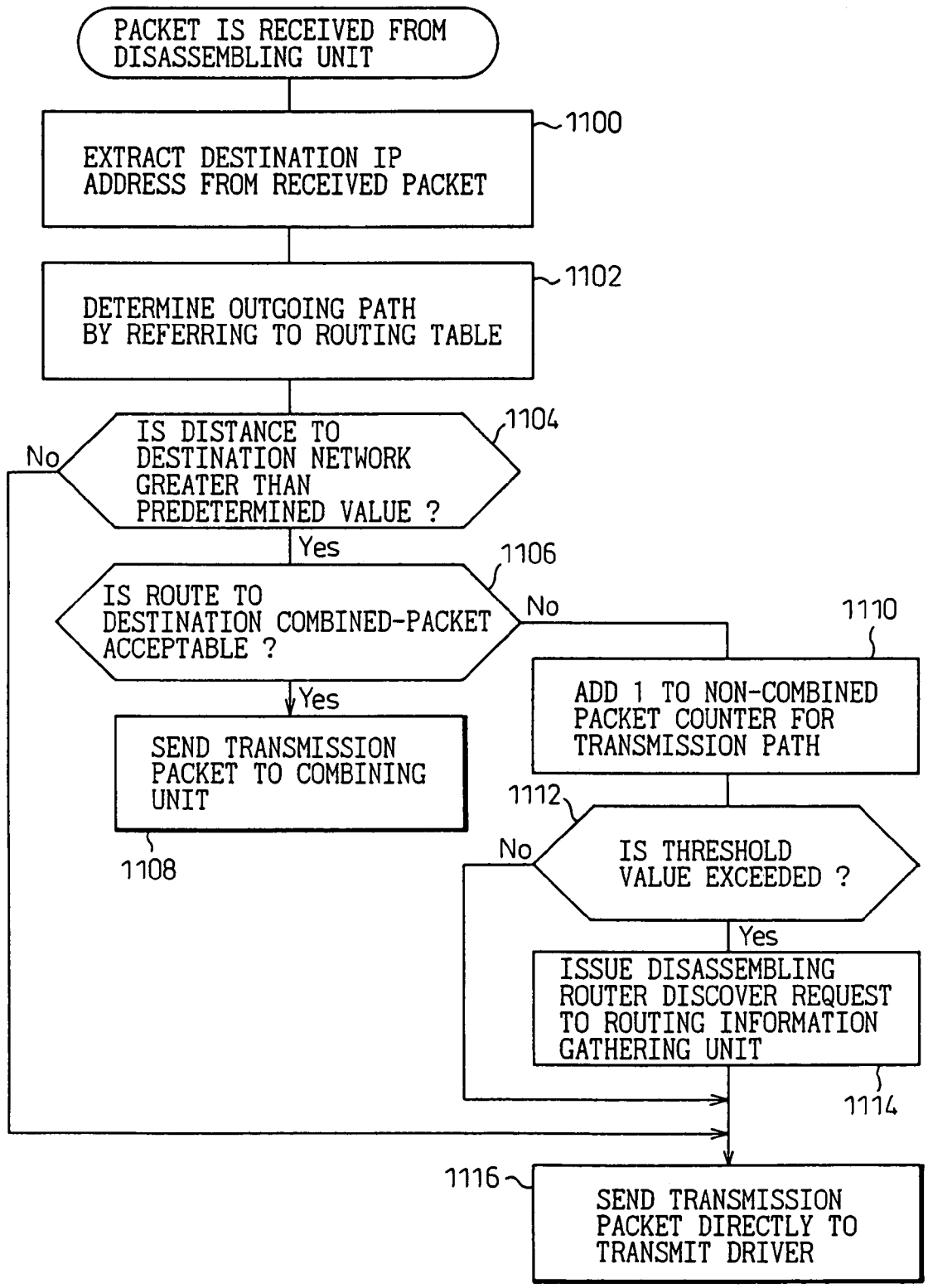
FIG. 10 is a flowchart illustrating the operation of a routing processing unit 8 in the first embodiment of the present invention.

FIG. 10 shows the process flow in the routing processing unit 8 when a packet is received from the disassembling unit 7. The routing processing unit 8 detects that the destination of the packet to be transmitted is the network D (step 1100), and selects the route to the-network D from the routing table (step 1102). By referring to the "COMBINE" column in the routing table, the routing processing unit 8 recognizes that the route to the network D is combined packet acceptable (step 1106). Since the packet to be transmitted is a packet to be combined, a combine request message is sent to the combining unit 11 (step 1108). In this case, if the value in the "DISTANCE" column is less than a predetermined value, the effect of packet combining is small, so the packet combining is not done (step 1104).

If the packet to be transmitted is one addressed to a combined packet unacceptable network, the packet is passed directly to the transmit driver 5 (step 1116). At this time, a non-combined packet counter for the transmission path is incremented (step 1110), and when the counter reaches a predetermined value (step 1112), a disassembling router discover request is issued to the routing information gathering unit 9 (step 1114). The routing information gathering unit 9 that received this message carries out the procedures described with reference to FIGS. 7 to 9, and incorporates the results into the routing table 10. Though not shown in FIG. 10, since the number of packets per unit time is measured and compared with a threshold value, the packet counter is reset each time the unit time elapses.

Figure 11:
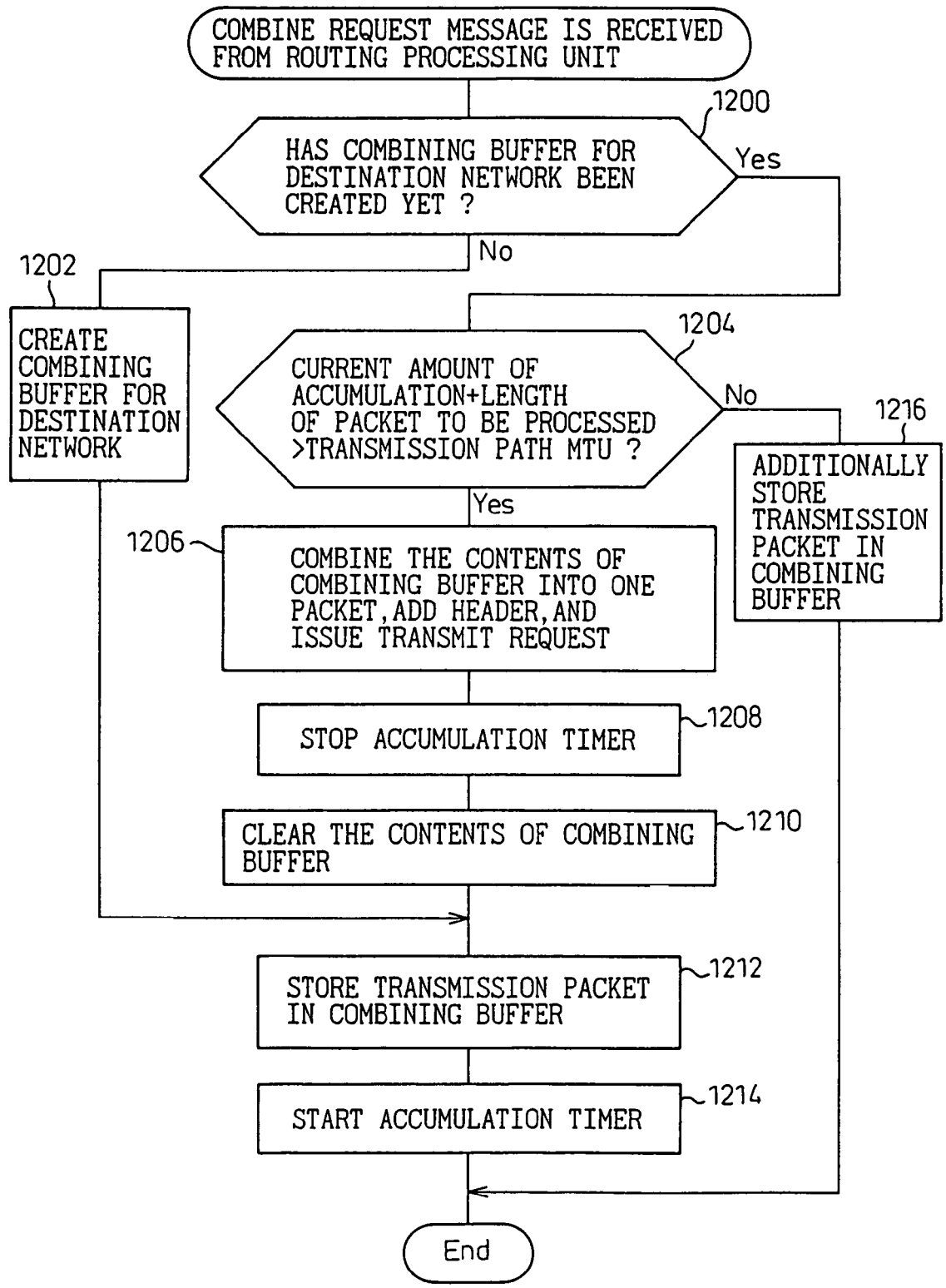
FIG. 11 is a flowchart illustrating the operation of a combining unit 11 in the first embodiment of the present invention.

FIG. 11 shows the process flow in the combining unit 11 when it receives the combine request message from the routing processing unit 8. The combining unit 11 manages the combining buffer 12 for each destination network designated by the message. Managing here means creating a buffer (securing a memory space) when necessary (steps 1200 and 1202). The packet to be transmitted is stored in the combining buffer created for the destination network, but before that, it is examined whether the combined size of the already stored packets and the current packet exceeds the MTU of the transmission route to the destination network (step 1204); if the combined size exceeds the MTU, the already stored packets are combined into one packet and the combined packet is sent out to the transmit driver (step 1206), after which the current packet is stored in the combining buffer (step 1212). If the combined size does not exceed the MTU, the current packet is additionally stored in the combining buffer (step 1216). If a new combining buffer is created to start accumulating packets, an accumulation timer is started (step 1214).

Figure 12:
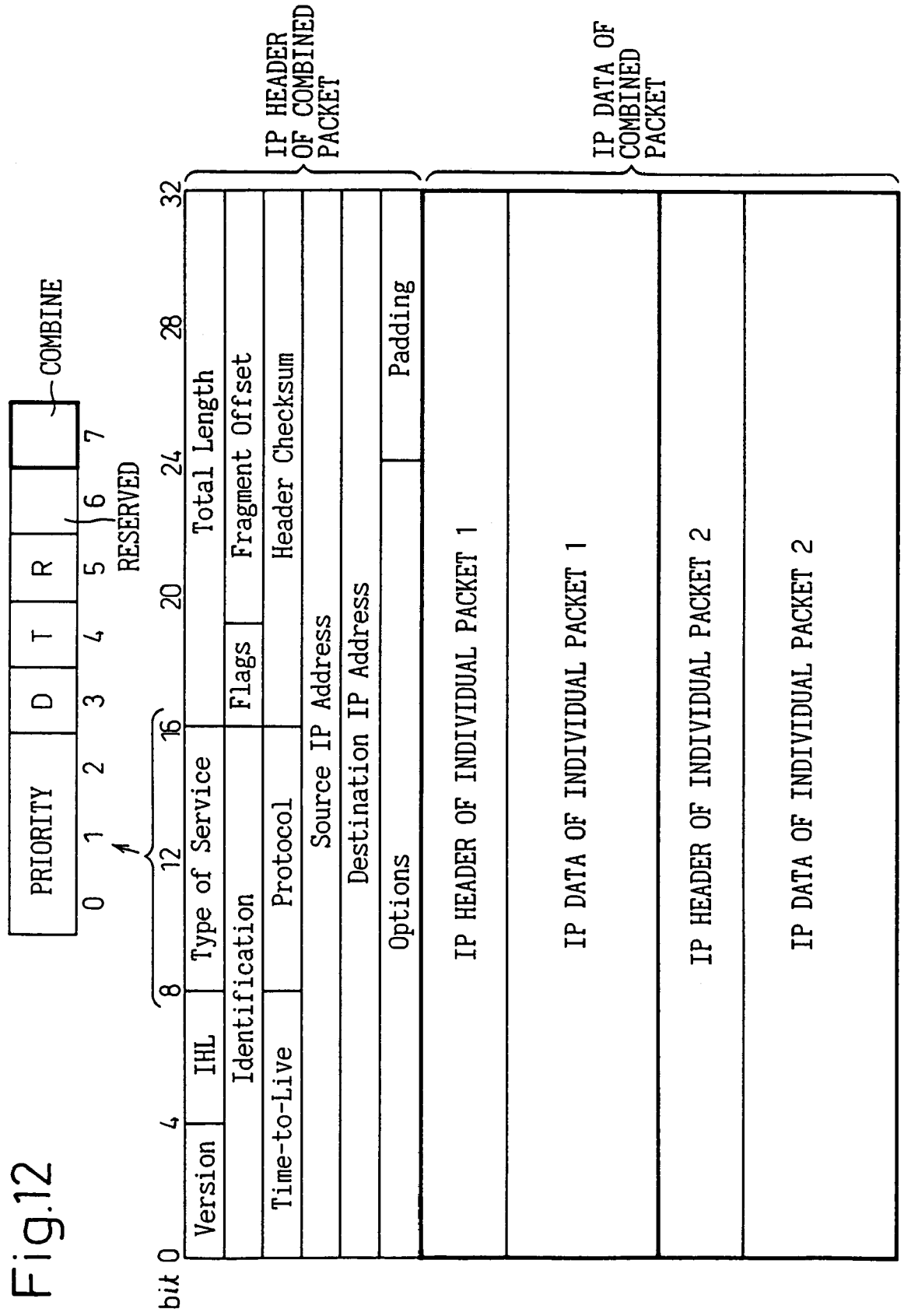
FIG. 12 is a diagram showing one example of a combined packet format.

When the accumulation timer has timed out, the contents of the combining buffer at that instant are combined into one packet, and the combined packet is sent to the transmit driver. When issuing a transmit request to the transmit driver, the address of the disassembling router is set in the Destination IP Address field in the IP header of the combined packet, and the combine bit in the Type of Service field is set to 1. The format of the combined packet is shown in FIG. 12.

When selecting a transmission route by referring to the routing table 10, if the routing table in the router 81 indicates more than one route to the same destination network as shown in FIG. 3, the routing processing unit 8 compares the MTUs of these routes and selects the route with the largest MTU.

Figure 13:
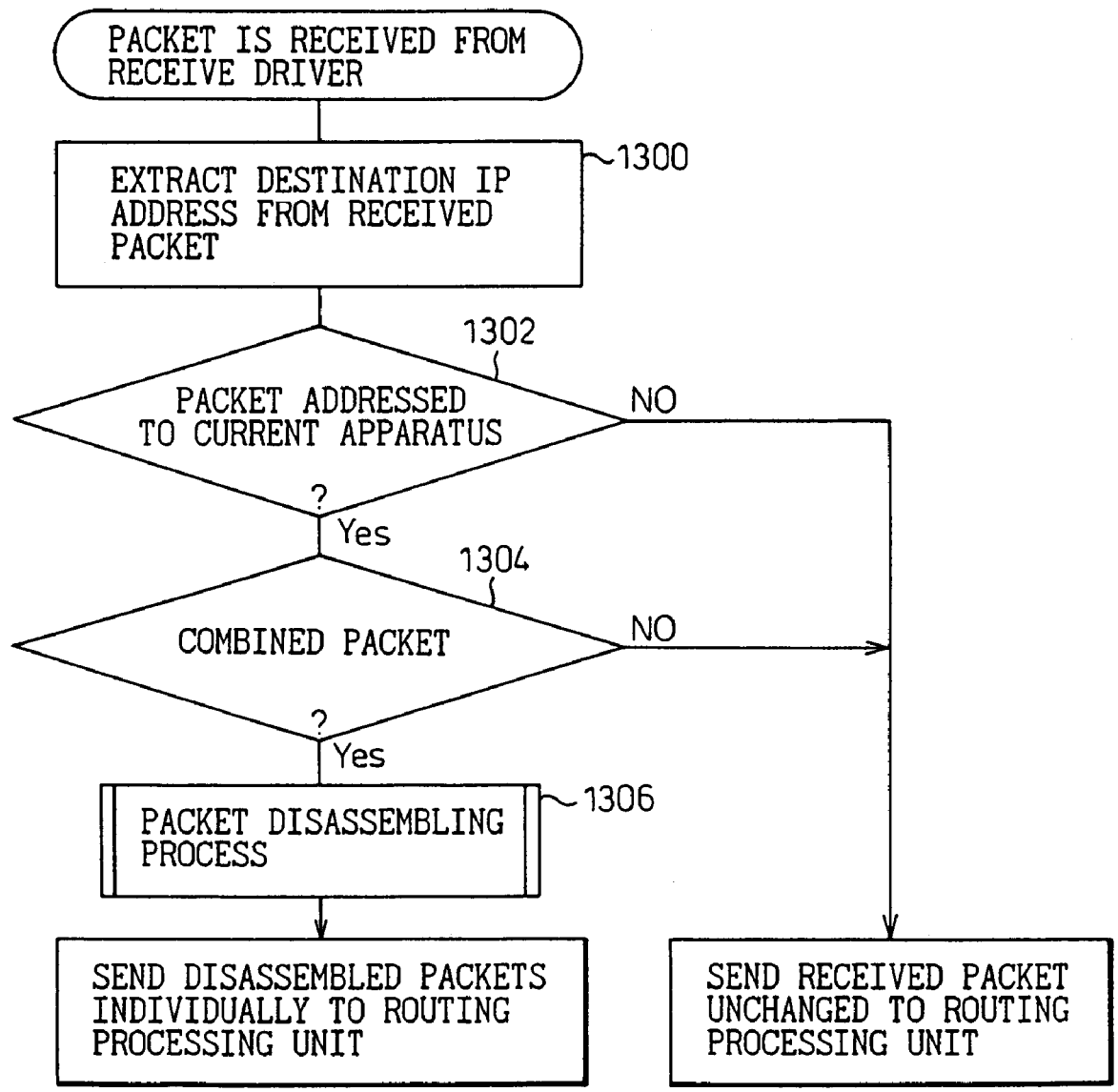
FIG. 13 is a flowchart illustrating the processing performed in a disassembling unit 7.
Figure 14:
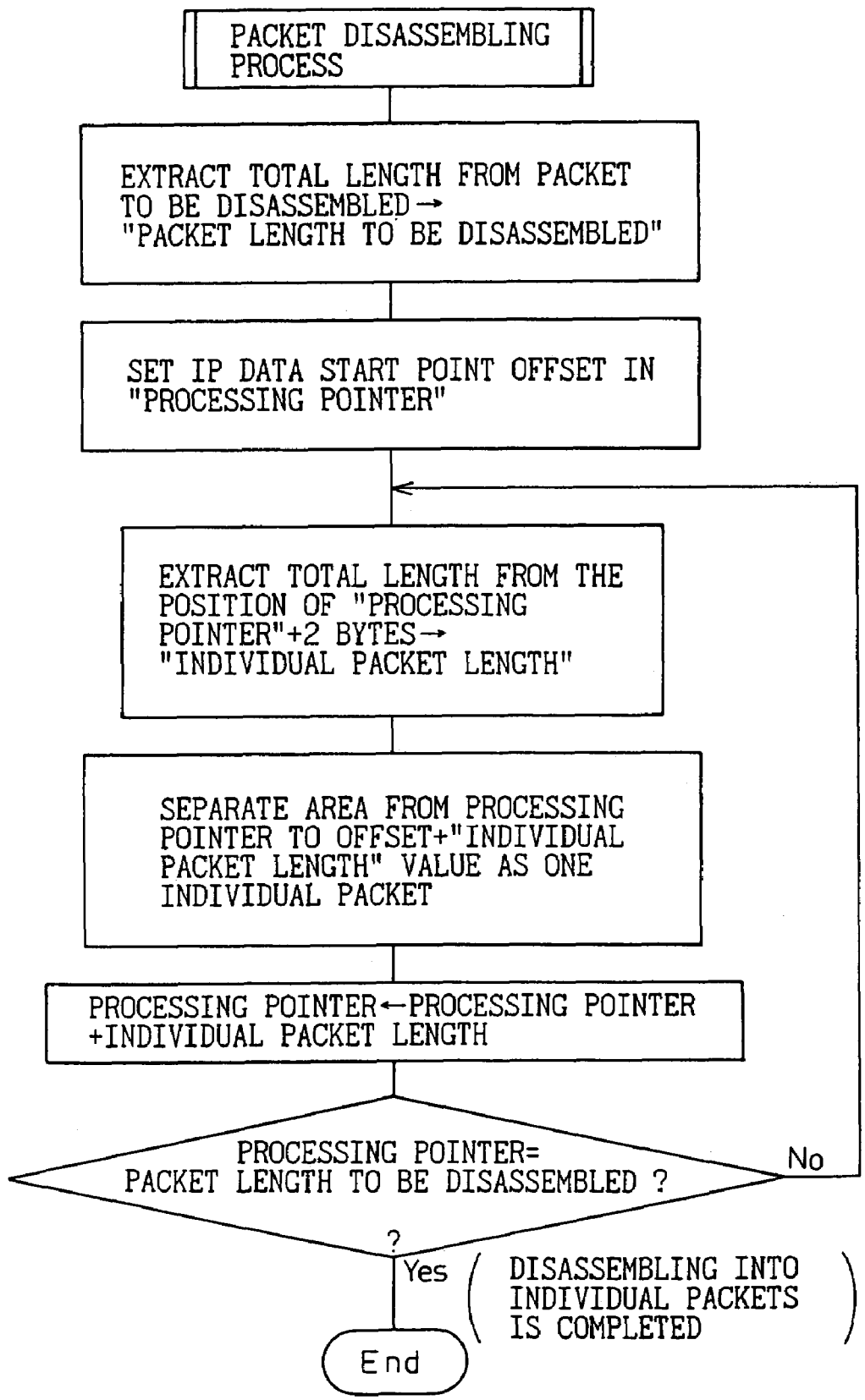
FIG. 14 is a flowchart illustrating the processing performed in the disassembling unit 7.
Figure 15:
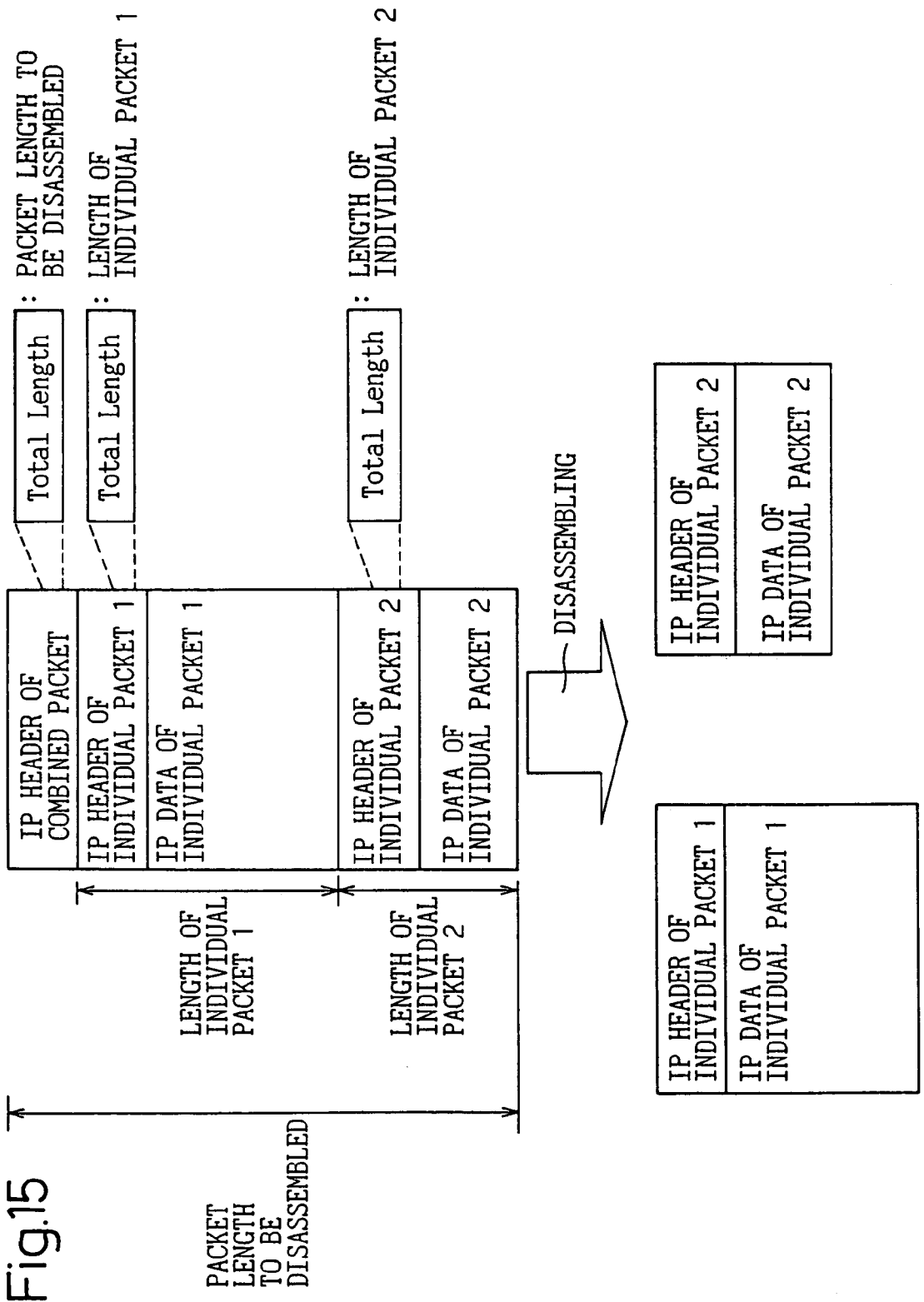
FIG. 15 is a diagram conceptually illustrating the process of disassembling.

FIGS. 13 and 14 show the processing performed in the disassembling unit when a combined packet is received. If it is detected that the received packet is a combined packet, and that the packet is addressed to the current apparatus (steps 1302 and 1303), it is determined that the packet should be disassembled, and the packet is thus disassembled into individual packets (step 1306). For disassembling, the Total Length data contained in the IP header of each individual packet is used. The combined packet disassembling process shown in FIG. 14 is illustrated in conceptual form in FIG. 15. The disassembled packets are sent to the routing processing unit. The routing processing unit processes these packets in accordance with the flow shown in FIG. 10.

Figure 16:
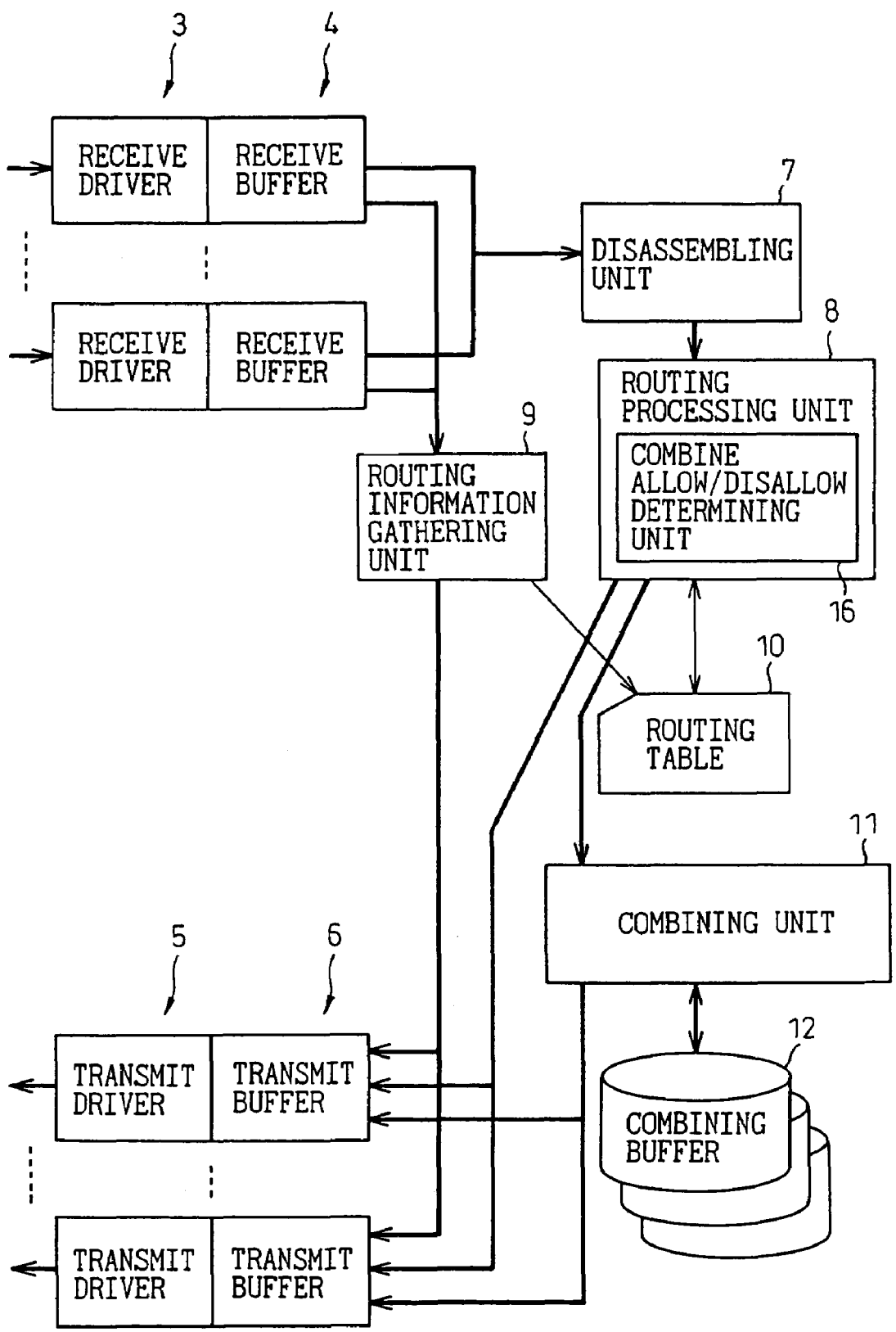
FIG. 16 is a block diagram of a network relay apparatus according to a second embodiment of the present invention.

FIG. 16 shows the configuration of a network relay apparatus (router) according to a second embodiment of the present invention. The same constituent elements as those in FIG. 1 are designated by the same reference numerals. In this embodiment, a combine allow/disallow determining unit 16 is added in the routing processing unit 8. As shown in FIG. 17, "PATH ATTRIBUTE" and "NETWORK CONDITION" columns are added in the routing table, and the routing information gathering unit 9 gathers these pieces of information as well. In the path attribute column, either REAL TIME ROUTE or NON-REAL TIME ROUTE is set. In the network condition column, CONGESTED, FAILED, NORMAL, etc. are set.

The method of setting and using "PATH ATTRIBUTE" and "NETWORK CONDITION" in the routing table shown in FIG. 17 will be described below. In existing routing protocols (for example, RIP), the best route for packet transmission is selected as the transmission route to the destination network. In the case of RIP, the shortest route is selected as the best route; in the routing table of FIG. 17, the route in the lower row is selected.

The routing information gathering unit 9 determines a regular route in accordance with the existing routing protocol, and sets "REAL TIME ROUTE" in the path attribute column. After that, the transmission path MTUs of all possible routes to the destination network, other than the real time route, are compared, and "NON-REAL TIME ROUTE" is set for the route having the largest MTU.

The path attribute column in FIG. 17 is set by the routing information gathering unit 9 in accordance with the above method.

When an ICMP Transmission Inhibit message is received from a router located along a transmission route, the routing information gathering unit 9 recognizes that the route passing through that router is congested, and sets "CONGESTED" in the network condition column. When an ICMP Destination Unreachable message is received from a router located along a transmission route, the routing information gathering unit 9 recognizes that a failure has occurred along the route passing through that router, and either sets "FAILED" in the network condition column or deletes all information concerning that route from the routing table. The network condition column in FIG. 17 is thus set by the routing information gathering unit 9.

The second embodiment of the present invention will be described using an example in which the combine allow/disallow determination is made by checking the attribute of the packet to be transmitted and an example in which the path selection is performed based on the network condition.

Figure 18:
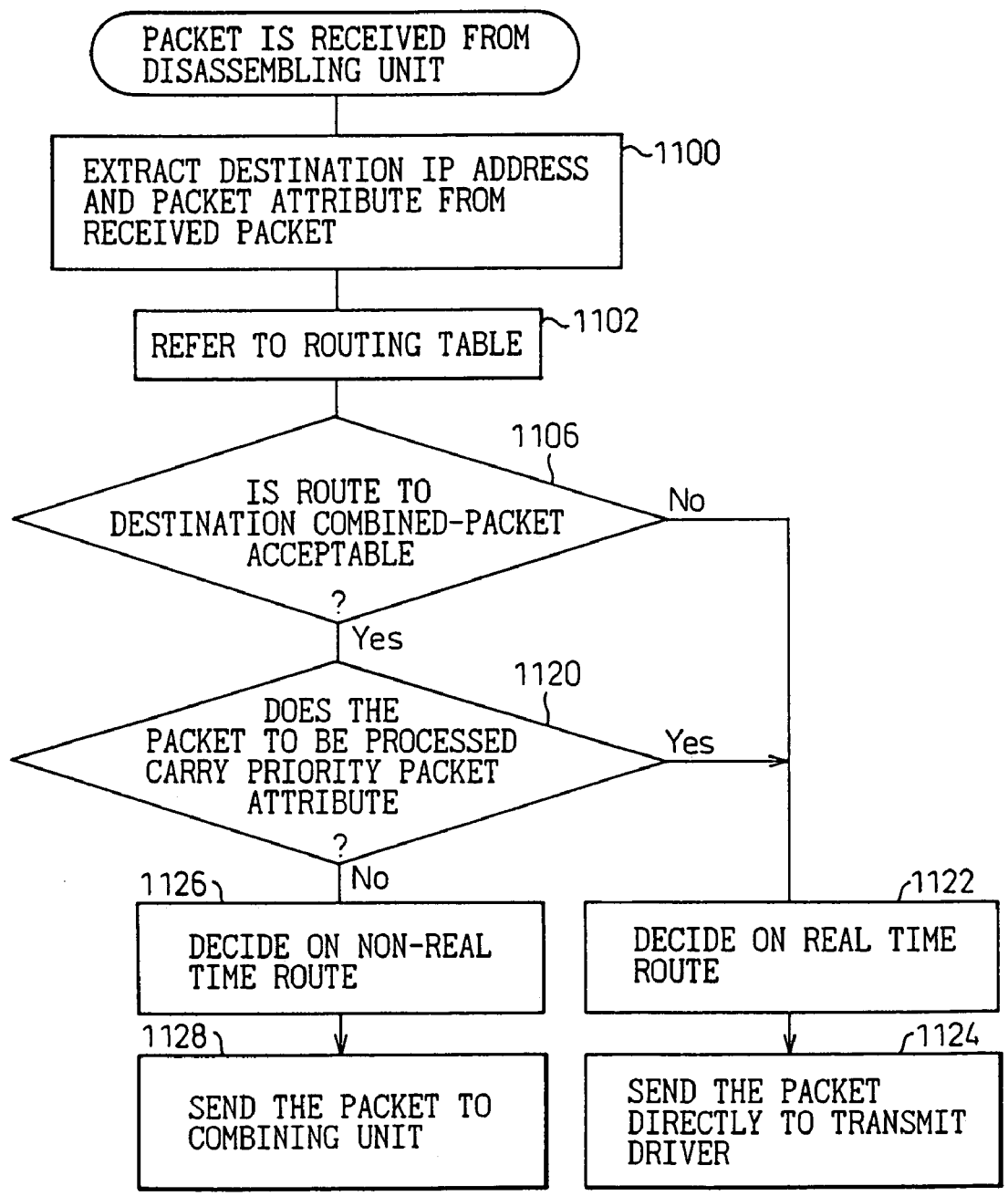
FIG. 18 is a flowchart illustrating the operation of a routing processing unit in the second embodiment of the present invention.

Example of Making the Combine Allow/Disallow Determination Based on the Packet Attribute:

FIG. 18 shows the processing flow in the routing processing unit when a packet to be transmitted is received from the disassembling unit. The routing processing unit 8 extracts a D bit from the Type of Service field (step 1100), and examines whether it indicates normal delay (value: 0) or low delay (value: 1) (step 1120). If it indicates low delay, the packet is recognized as being a priority packet, and the combine allow/disallow determining unit 16 determines that the packet should not be combined, and sends the packet directly to the transmit driver 5 (step 1124). At this time, the real time route is selected from the plurality of routes shown in the routing table of FIG. 17 as being selectable for the network D (step 1122). In the case of normal delay, it is determined that the packet is a non-priority packet, and a non-real time route is selected (step 1126), after which the packet is sent to the combining unit 11 (step 1128). Example of performing the path selection based on the network condition:

When a packet to be transmitted is received from the disassembling unit, the network condition column in the routing table (see FIG. 17) is examined, and the outgoing path for the packet is determined by avoiding a congested route.

Figure 19:
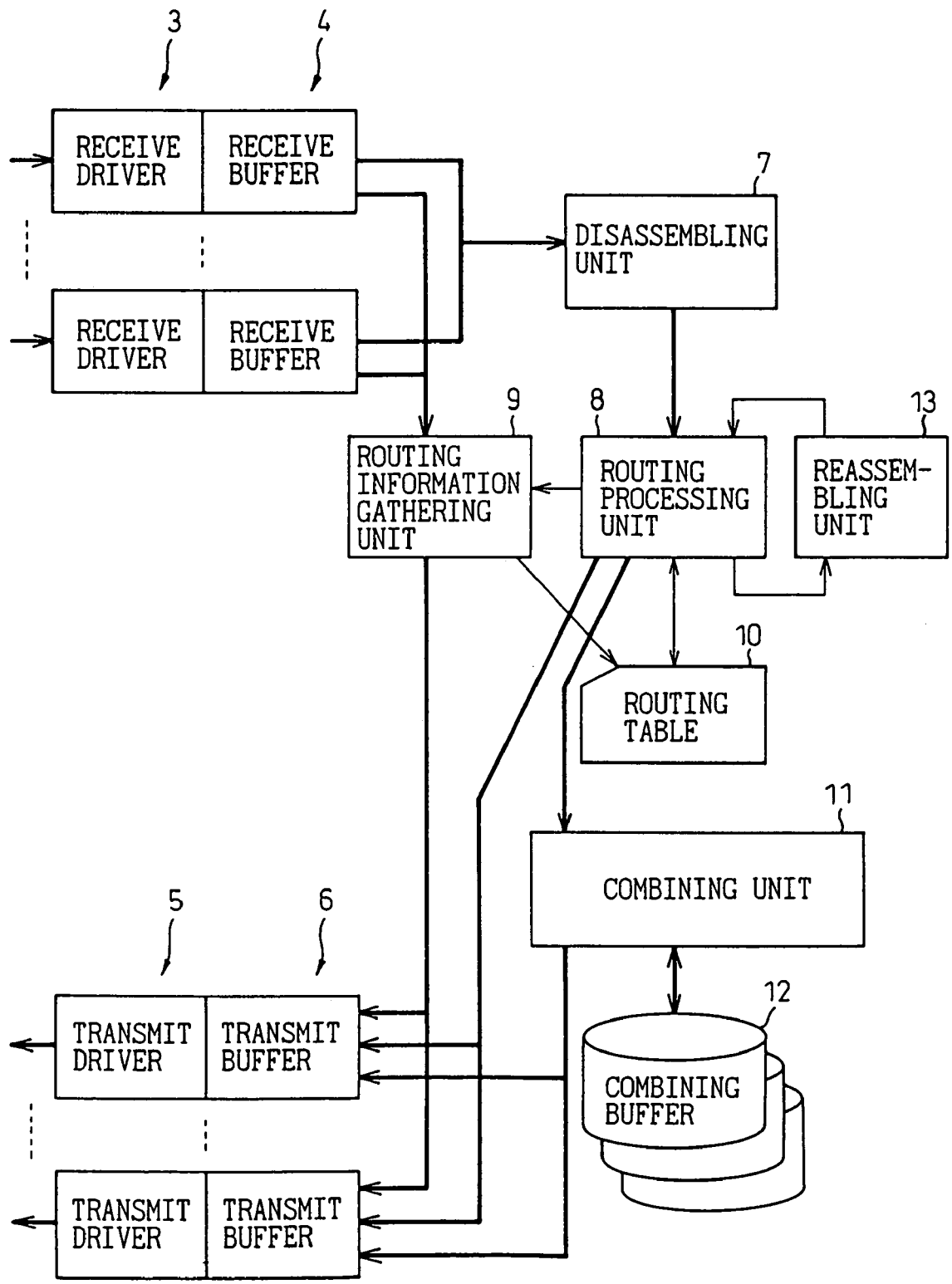
FIG. 19 is a block diagram of a network relay apparatus according to a third embodiment of the present invention.

FIG. 19 shows the configuration of a network relay apparatus according to a third embodiment of the present invention. In the embodiment of FIG. 19, a reassembling unit 13 is added. If the route is changed due to the occurrence of a failure in a network along the transmission route of the combined packet, a situation may occur where the MTU of the new transmission route is smaller than the length of the combined packet. If this happens, the reassembling unit 13 reassembles the combined packet so that the packet length will fit in the MTU of the new transmission route.

Figure 20:
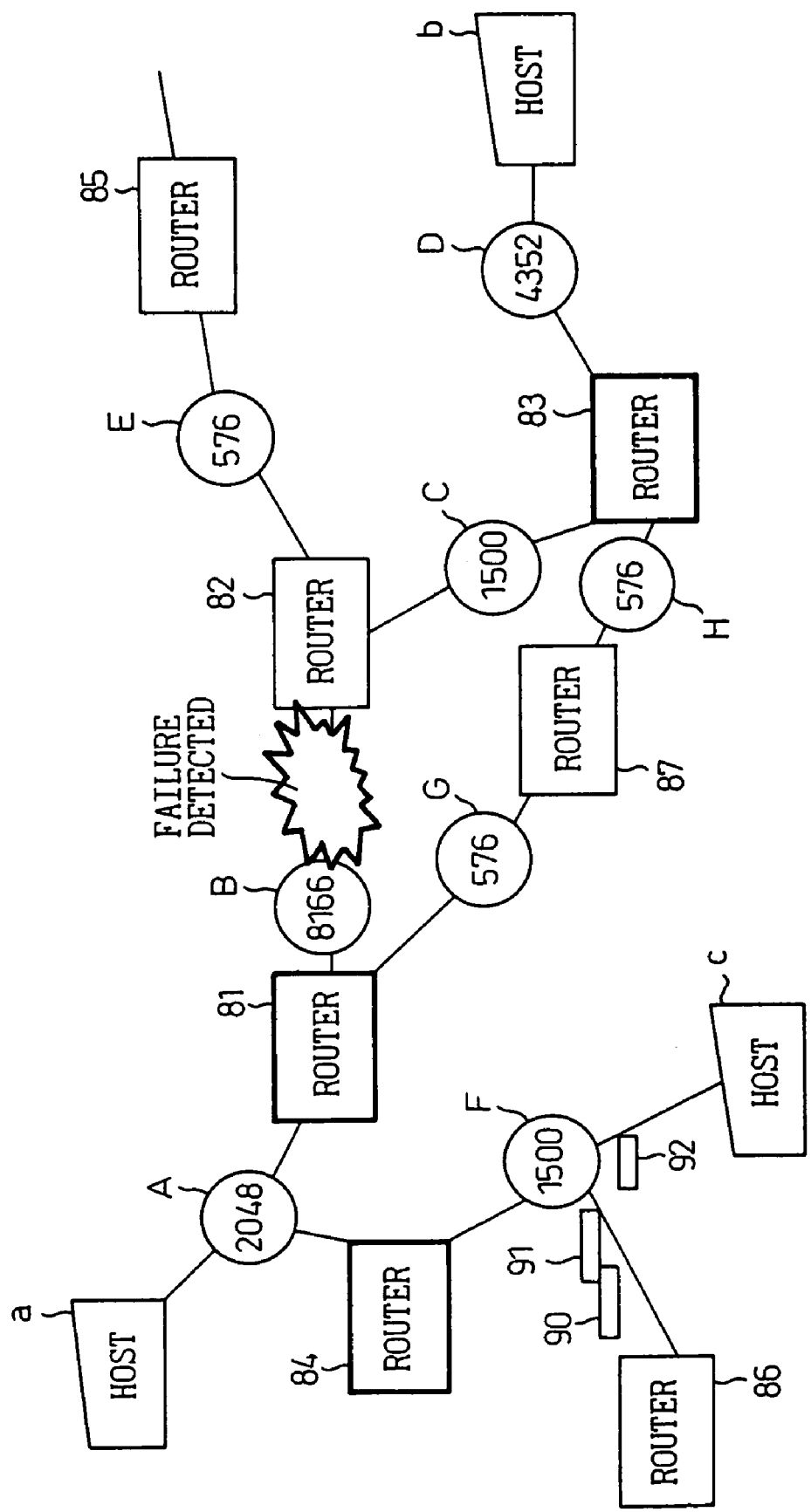
FIG. 20 is a diagram for explaining the operation of a reassembling unit 13.

An explanation will be given below dealing with the case shown in FIG. 20 where the router 86 sent out a packet 90 of 200 bytes and a packet 91 of 300 bytes and the host c sent out a packet 92 of 700 bytes, all destined for the network D, and though all the networks were operating normally when the router 84 processed the packets, a failure occurred in the intermediate network between the router 81 and the router 82 at the time that the packets reached the router 81.

In accordance with the routing table of FIG. 21, the router 84 transmits a combined packet containing the three packets onto the network A. When the router 84 sends out the combined packet, the route passing through the networks A, B, and C and reaching the network D is selected for the transmission of the combined packet. When the combined packet sent out from the router 84 reaches the router 81, a failure occurs in the network B through which the packet is to be routed. Upon detection of the failure, the router 81 performs the following processing to reassemble the combined packet and to reroute the packets along the networks G and H. The combined packet is reassembled into a combined packet consisting of the packet of 200 bytes and the packet of 300 bytes and an individual packet consisting only of the packet of 700 bytes.

Figure 23:
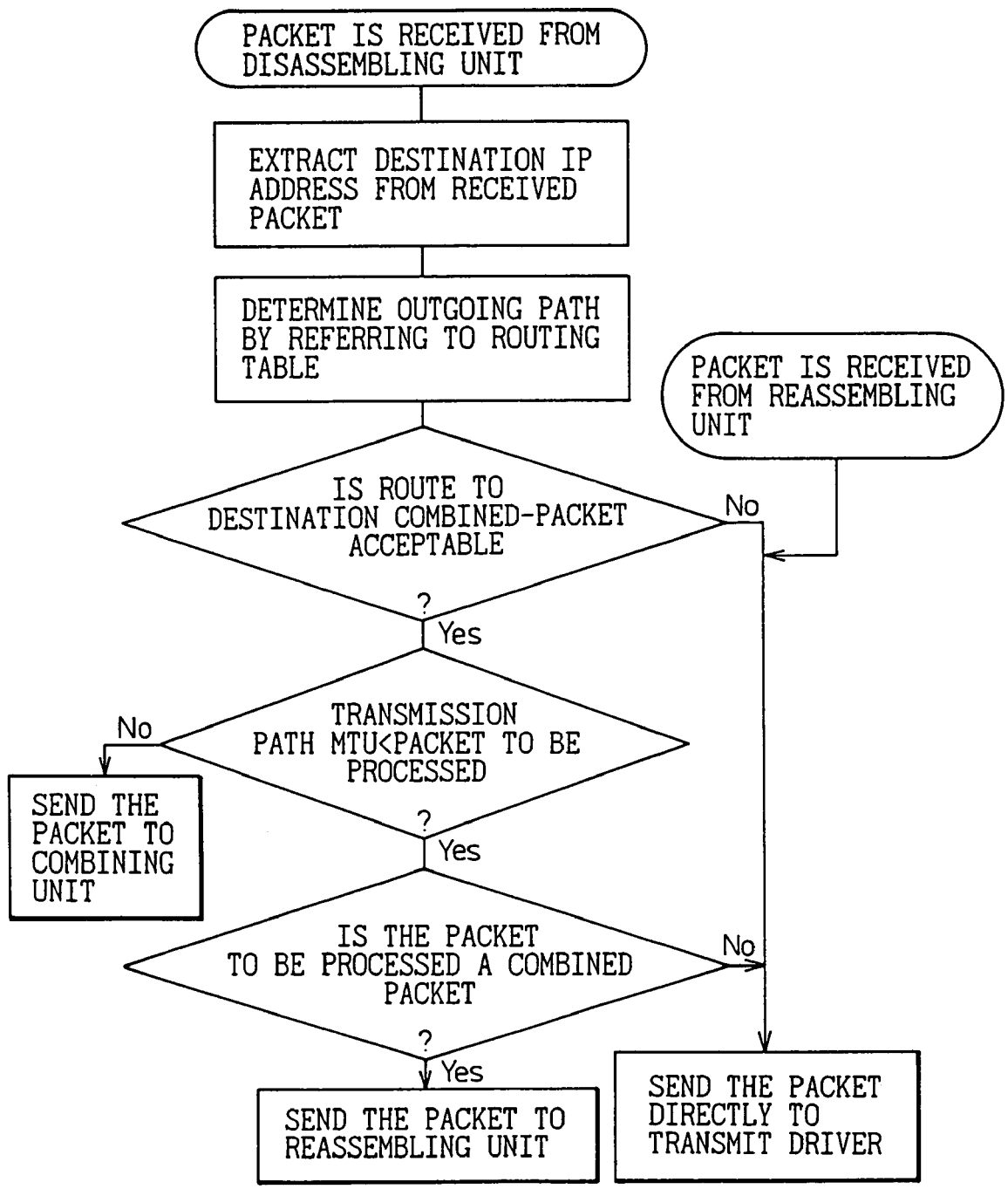
FIG. 23 is a flowchart illustrating the operation of a routing processing unit 8 in the third embodiment of the present invention.

The processing flow from the time the router 81 receives the packets from the transmission line to the time the routing processing unit extracts the destination address is the same as that described previously. Upon detection of the failure, the routing information gathering unit in the router 81 either sets the failed state in the network condition column in the routing table or deletes the routing information from the routing table. When determining the transmission route by referring to the routing table of FIG. 22, the routing processing unit avoids the failed route and selects the route whose transmission path MTU is 576. Since the combined packet size is larger than 1200 bytes, if the combined packet is transmitted as is, fragmentation will occur; therefore, the packet to be reassembled is detected in accordance with the method illustrated in FIG. 23, and is sent to the reassembling unit.

Figure 24:
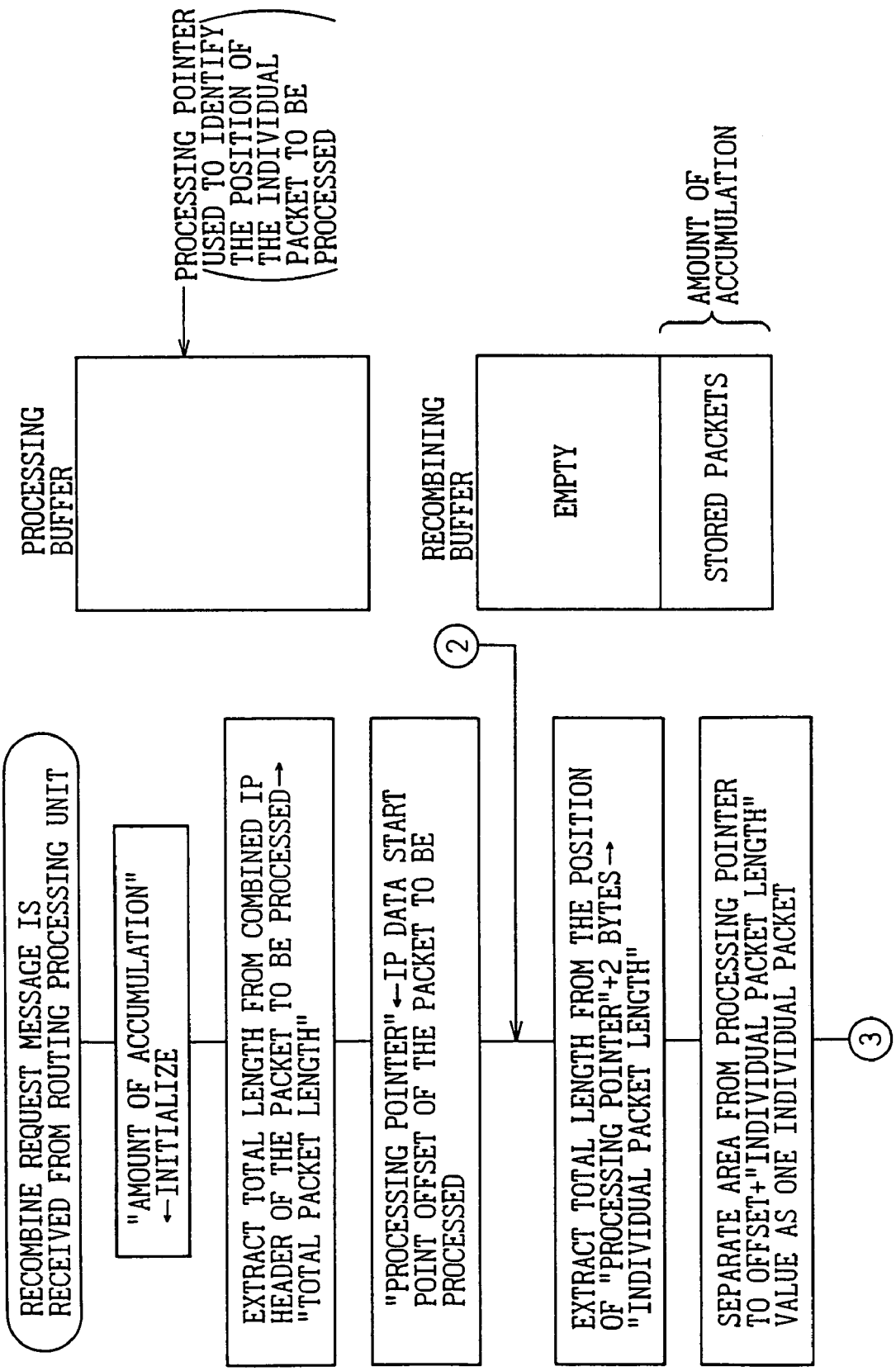
FIG. 24 is the first half of a flowchart illustrating the operation of the reassembling unit 13.
Figure 25:
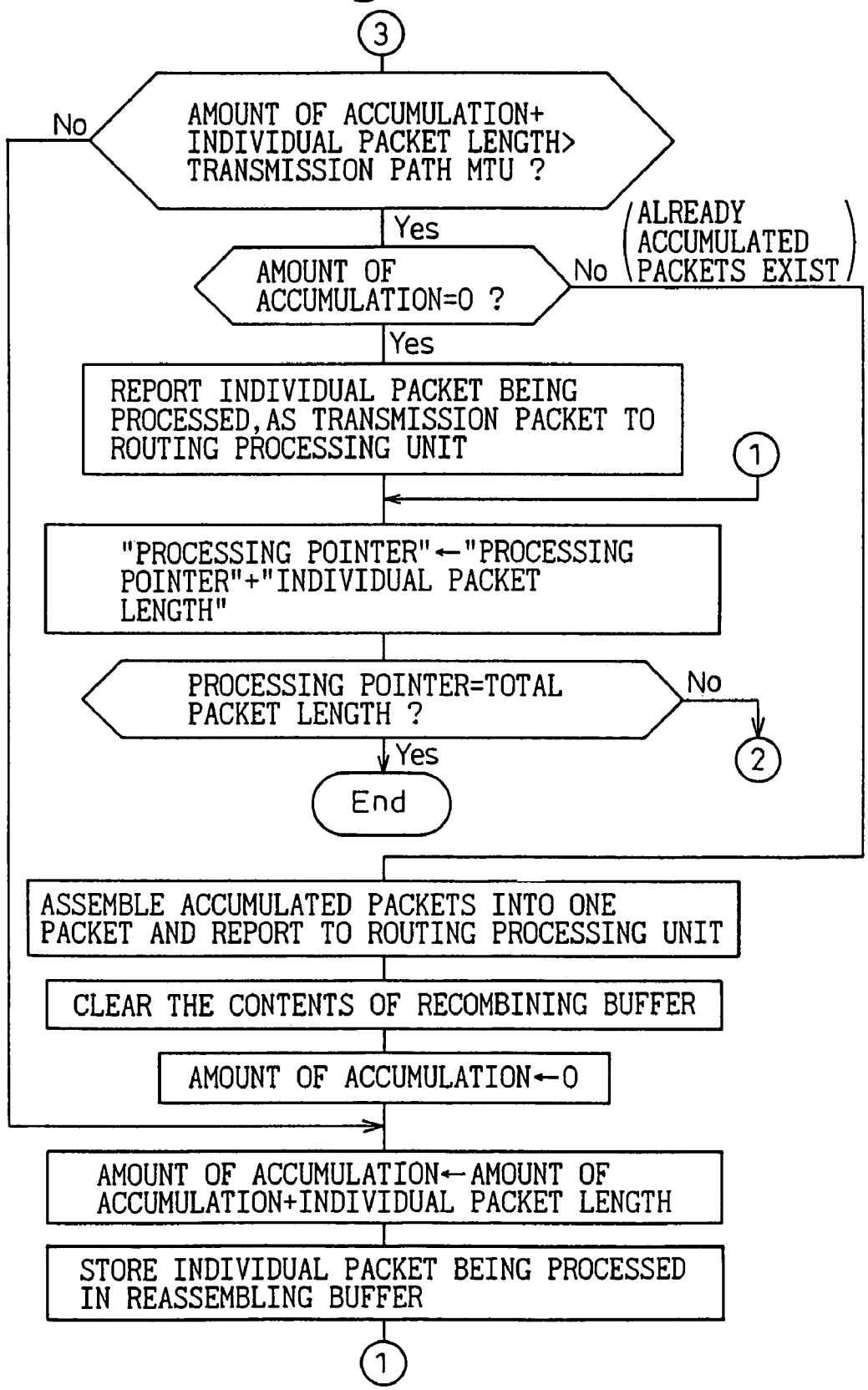
FIG. 25 is the second half of the flowchart illustrating the operation of the reassembling unit 13.

The reassembling unit 13 that received the reassemble request performs the processing shown in FIGS. 24 and 25. The individual packets stored in a processing buffer are reassembled by considering the amount to be stored in a recombining buffer, the size of each individual packet, and the MTU of the transmission route. As each packet is determined for processing, the packet is sent to the routing processing unit. The remainder of the processing is the same as that described in the first embodiment.

Figure 26:
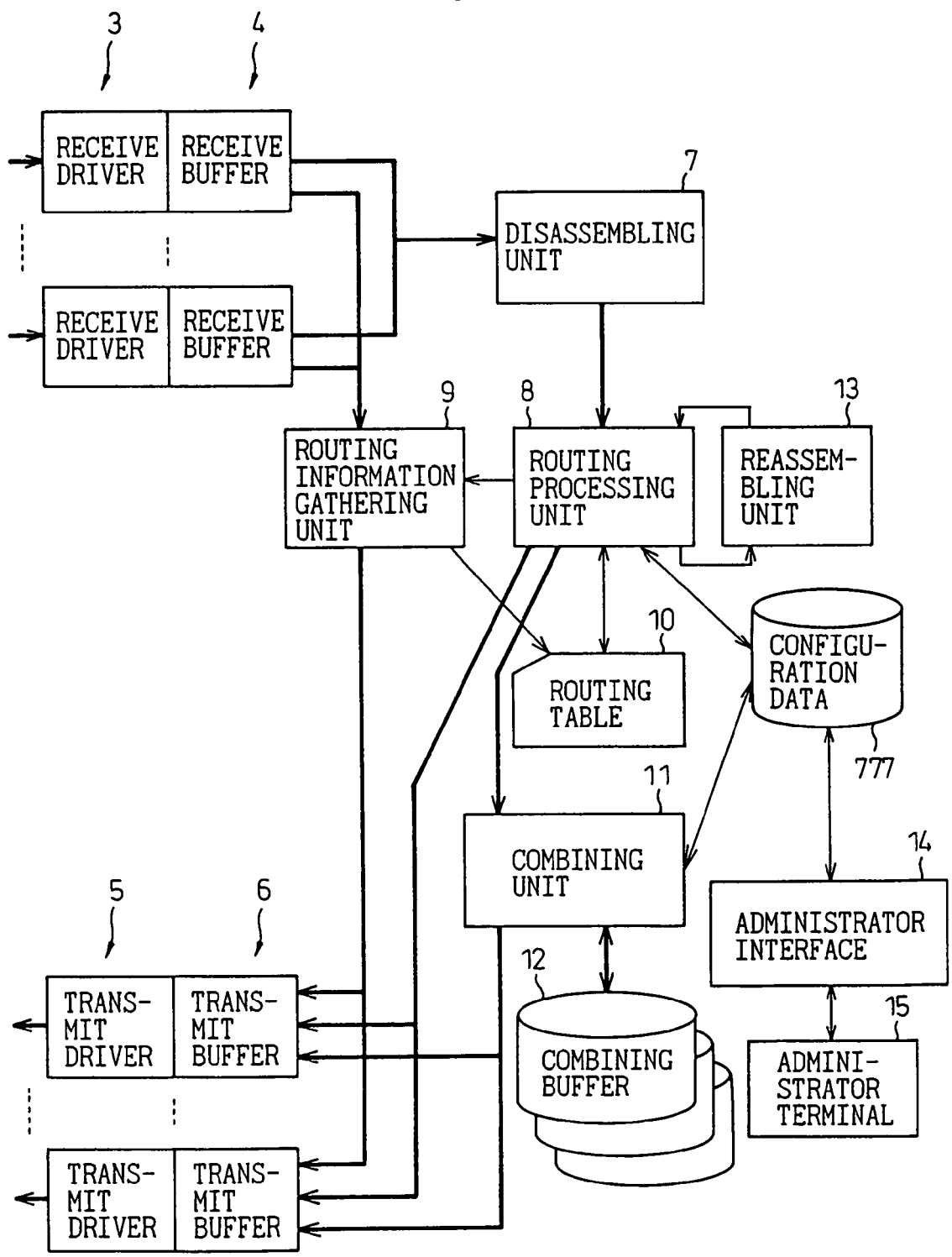
FIG. 26 is a block diagram of a network relay apparatus according to a fourth embodiment of the present invention.

FIG. 26 shows the configuration of a network relay apparatus according to a fourth embodiment of the present invention. In FIG. 26, when a request to alter configuration data 777 is received from an administrator terminal 15, an administrator interface 14 changes the corresponding portion of the configuration data 777 in accordance with the request.

The routing processing unit 8 and the combining unit 11 evaluate necessary values by referring to the configuration data 777.

Figure 27:
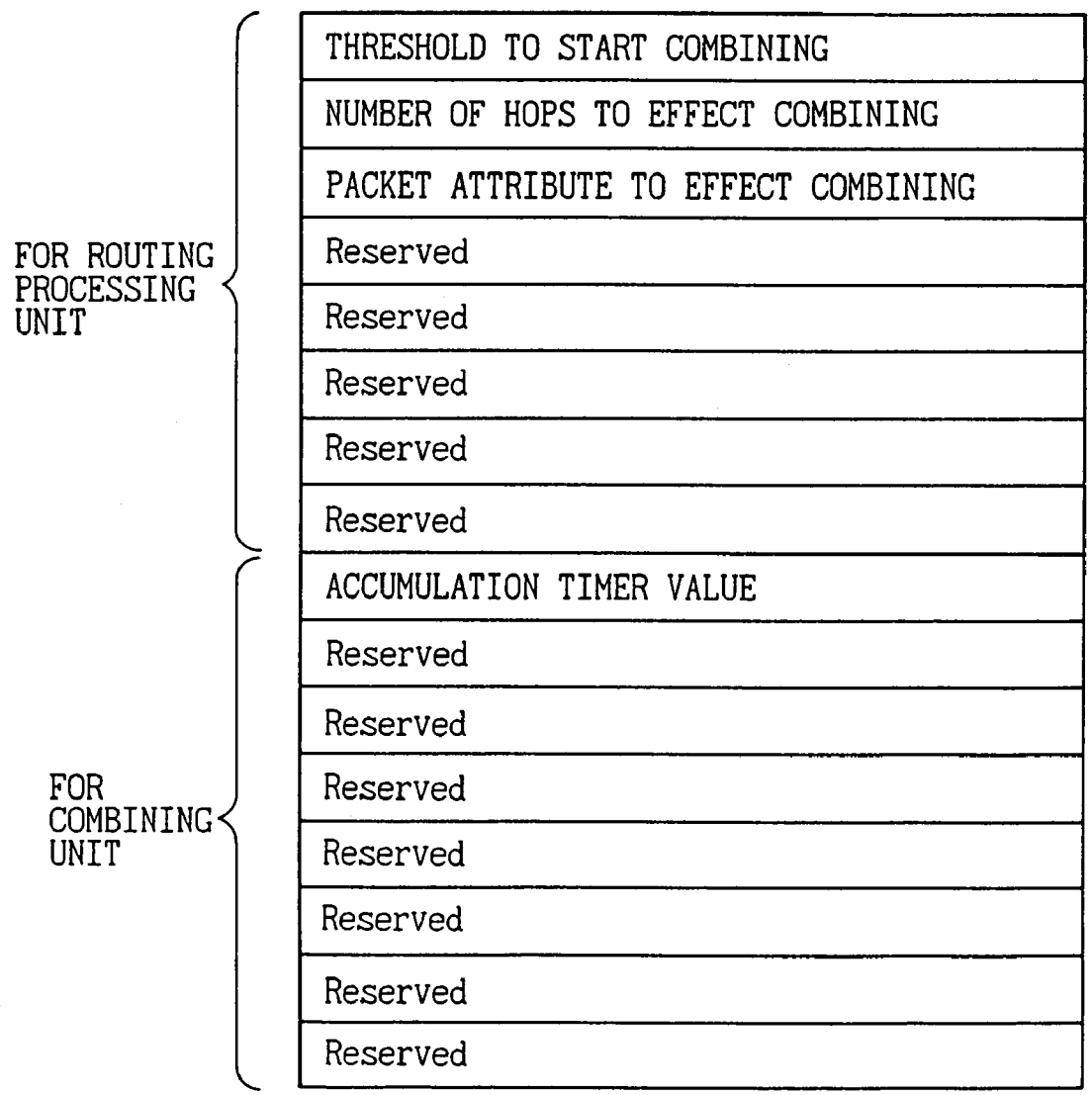
FIG. 27 is a diagram showing one example of configuration data 777.

FIG. 27 shows the contents of the configuration data 777. In FIG. 27, "THRESHOLD TO START COMBINING" is the threshold value used in step 1112 in FIG. 10 to determine whether the packet is to be combined or not. Since packet combining is effective when applied to a route where there is traffic larger than a certain amount, the system can be optimized by changing this threshold value. "NUMBER OF HOPS TO EFFECT COMBINING" is the threshold value used in step 1104 in FIG. 10. Since packet combining is effective when applied to a route having a length longer than a certain length, this threshold value is optimized. "PACKET ATTRIBUTE TO EFFECT COMBINING" is used in step 1120 in FIG. 18 and specifies the attribute of the packet that should be combined. Since the proportion of the packets to be combined changes by changing this value, the system can be optimized for effective utilization of the network bandwidth. "ACCUMULATION TIMER VALUE" is the value of the accumulation timer activated in step 1214 in FIG. 11. The greater the value, the more packets can be combined, but the longer the delay time may become; therefore, a suitable value can be set.

As described above, according to the present invention, the following effects can be obtained.

(1) Since the combined packet size is determined by considering transmission path MTU, packets can be combined into an optimum size that matches the type of transmission line forming the transmission path; this serves to reduce the processing load for routing control in a network relay apparatus. Furthermore, since the combined packet is processed as an ordinary packet in an intermediate network relay apparatus located along the route between the packet combining network relay apparatus and the packet disassembling network relay apparatus, existing network equipment installed along the route is unaffected.

(2) Since a route capable of carrying a combined packet of a large size is selected by comparing the MTUs of all possible transmission routes, the number of packets to be transmitted can be reduced, and the processing load for routing control in a network relay apparatus can thus be reduced.

(3) By making the combine allow/disallow determination based on the packet attribute, only packets having a low real time requirement can be selected as packets to be combined, and the processing load for routing control in a network relay apparatus can be reduced while ensuring real time transmission for time critical packets. Furthermore, by performing routing control based on the packet attribute, a route for a time critical packet and a route for a combined packet can be set up separately, contributing to effective utilization of the transmission bandwidth.

Since the packet combine allow/disallow determination is made by considering the network condition, if congestion or degradation in communication quality occurs increasing the probability of packet loss, the influence of packet loss can be reduced by transmitting packets without combining them. Further, when congestion or degradation in communication quality is detected, routing control such as changing the route for a combined packet becomes possible, enabling the selection of an optimum communication path.

(4) Furthermore, when it becomes necessary to change the path outgoing from the current apparatus due to the occurrence of a failure, etc. along the transmission route of a combined packet, packet fragmentation can be prevented by reassembling the combined packet, and this also serves to reduce the network load.

(5) By setting the communication mode in accordance with a request from the administrator, the network load can be reduced as required by the administrator.

The invention claimed is:

1. A network relay apparatus comprising:
   a routing information gathering unit for determining the maximum transmission unit of a transmission path along a route over which packets are to be transmitted;
   a combining unit for assembling a combined packet by combining packets up to a length that does not exceed the maximum transmission unit of said transmission path; and
   a routing processing unit for excluding a path along a shortest route to a same destination, comparing maximum transmission units of a remaining plurality of transmission paths to the same destination, and selecting a path having the largest maximum transmission unit as a path for said combined packet from among the remaining plurality of transmission paths to the same destination.

2. An apparatus according to claim 1, wherein said combined packet carries as a destination address the address of an endpoint of the route over which said packets are transmitted in combined form, said apparatus further comprising:
   a disassembling unit for disassembling a received combined packet into individual packets if the destination address of said received combined packet matches the address of said apparatus.

3. An apparatus according to claim 1, further comprising a combine allow/disallow determining unit for determining, based on a packet attribute, whether or not said combining unit should be made to combine packets.

4. An apparatus according to claim 1, further comprising a reassembling unit for disassembling a received combined packet into individual packets and reassembling the same into a combined packet of a length not exceeding the maximum transmission unit of the currently selected path if the length of said received combined packet exceeds said maximum transmission unit.

5. A method of combining packets, comprising the steps of:
   determining the maximum transmission unit of a transmission path along a route over which packets are to be transmitted;
   assembling a combined packet by combining packets up to a length that does not exceed the maximum transmission unit of said transmission path;
   excluding a path along a shortest route to a same destination;
   comparing maximum transmission units of a remaining plurality of transmission paths to the same destination; and
   selecting a path having a largest maximum transmission unit as a path for said combined packet from among the remaining plurality of transmission paths to the same destination.

6. A method according to claim 5, wherein said combined packet carries as a destination address the address of an endpoint of the route over which said packets are transmitted in combined form, said method further comprising the step of:

disassembling a received combined packet into individual packets if the destination address of said received combined packet matches the address of an apparatus that received said combined packet.

7. A method according to claim 5, further comprising the step of determining, based on a packet attribute, whether to combine or not combine packets.

8. A method according to claim 5, further comprising the step of disassembling a received combined packet into individual packets and reassembling the same into a combined packet of a length not exceeding the maximum transmission unit of the currently selected path if the length of said received combined packet exceeds said maximum transmission unit.

* * * * *